US005935240A

United States Patent [19]
Mennemeier et al.

[11] Patent Number: 5,935,240
[45] Date of Patent: Aug. 10, 1999

[54] COMPUTER IMPLEMENTED METHOD FOR TRANSFERRING PACKED DATA BETWEEN REGISTER FILES AND MEMORY

[75] Inventors: Larry M. Mennemeier, Boulder Creek, Calif.; Alexander D. Peleg, Haifa, Israel; Andrew F. Glew, Hillsboro, Oreg.; Carole Dulong, Saratoga, Calif.; Eiichi Kowashi, Ryugasaki, Japan; Millind Mittal, Mendham, N.J.; Wolf Witt, Walnut Creek, Calif.; Benny Eitan, Haifa, Israel

[73] Assignee: Intel Corporation, Santa Clara, Calif.

[21] Appl. No.: 08/573,238

[22] Filed: Dec. 15, 1995

[51] Int. Cl.⁶ ..................................................... G06F 9/305
[52] U.S. Cl. .......................................... 712/225; 345/501
[58] Field of Search ............................... 395/800.23, 566, 395/800.41, 800.42, 376; 345/511, 522, 501; 711/2

[56] References Cited

U.S. PATENT DOCUMENTS

| | | | |
|---|---|---|---|
| 3,711,692 | 1/1973 | Batcher | 364/715.09 |
| 3,723,715 | 3/1973 | Chen et al. | 364/786.04 |
| 4,161,784 | 7/1979 | Cushing et al. | 364/748.19 |
| 4,393,468 | 7/1983 | New | 364/749 |
| 4,418,383 | 11/1983 | Doyle et al. | 395/307 |
| 4,498,177 | 2/1985 | Larson | 371/52 |
| 4,707,800 | 11/1987 | Montrone et al. | 364/788 |
| 4,771,379 | 9/1988 | Ando et al. | 395/800.42 |
| 4,989,168 | 1/1991 | Kuroda et al. | 364/715.09 |
| 5,095,457 | 3/1992 | Jeong | 364/758 |
| 5,187,679 | 2/1993 | Vassiliadis | 364/786.01 |

OTHER PUBLICATIONS

Atkins, Mark, Performance and the i860 Microprocessor, IEEE, pp. 24–27, 72–78, Dec. 1991.
Diefendoroff, Keith et al., Organization of the Motorola 88110 Superscalar RISC Microprocessor, IEEE, pp. 40–63, Dec. 1992.
Gwennap, Linley, UltraSparc add multimedia instruction, Microprocessor Report, pp. 16–18, text only, Dec. 1994.
J. Shipnes, Graphics Processing with the 88110 RISC Microprocessor, IEEE (1992), pp. 169–174.
*MC88110 Second Generation RISC Microprocessor User's Manual*, Motorola Inc. (1991).
*Errata to MC88110 Second Generation RISC Microprocessor User's Manual*, Motorola Inc. (1992), pp. 1–11.
*MC88110 Programmer's Reference Guide*, Motorola Inc. (1992), pp. 1–4.

(List continued on next page.)

*Primary Examiner*—Zarni Maung
*Assistant Examiner*—Patrice L. Winder
*Attorney, Agent, or Firm*—Blakely, Sokoloff, Taylor & Zafman

[57] ABSTRACT

A method for transferring packed data including the steps of first receiving an instruction from a set of instructions for transferring packed data between an extended register file and either an integer register file or a memory. In one embodiment, the extended register file includes eight registers, with each of the extended register storing up to sixty-four data bits. The integer register file also includes eight registers. The instruction includes an opcode that specifies a direction of the transfer with respect to the extended register file. The instructions are encoded in an instruction format having up to three bits addressing a destination operand and up to three bits addressing a source operand. The instruction is then translated to determine a direction of the transfer, a size of said packed data to be transferred, the address of the destination operand, and the address of the source operand. The instruction decoded by a decoder unit previously designed to decode the instruction format used to encode the set of instructions. In response to receiving the instruction, the packed data is transferred between the extended register file and either the integer register file or the memory, pursuant to the specifications of the translated instruction.

18 Claims, 8 Drawing Sheets

OTHER PUBLICATIONS

*i860™ Microprocessor Family Programmer's Reference Manual*, Intel Corporation (1992), Ch. 1, 3, 8, 12.

R. B. Lee, Accelerating Multimedia With Enhanced Microprocessors, IEEE Micro (AApr. 1995), pp. 22–32.

*TMS320C2x User's Guide*, Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video*, Microprocessor Report (Jan. 1994), pp. 16, 17.

SPARC Technology Business, *UltraSPARC Multimedia Capabilities On–Chip Support for Real–Time Video and Advanced Graphics*, Sun Microsystems (Sep. 1994).

Y. Kawakami et al., *LSI Applications: A Single–Chip Digital Signal Processor for Voiceband Applications*, Solid State Circuits Conference, Digest of Technical Papers; IEEE International (1980).

B. Case, *Philips Hopes to Displace DSPs with VLIW*, Microprocessor Report (Dec. 94), pp. 12–18.

N. Margulis, *i860 Microprocessor Architecture*, McGraw Hill, Inc. (1990) Ch. 6, 7, 8, 10, 11.

*Pentium Processor User's Manual, Volume 3: Architecture and Programming Manual*, Intel Corporation (1993), Chapters 1, 3, 4, 6, 8, and 18 and pp. 25–1 to 25–5 of Chapter 25.

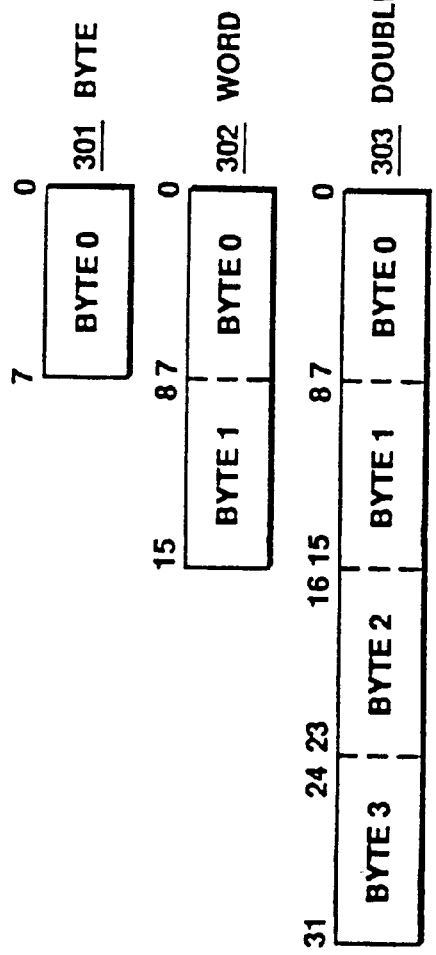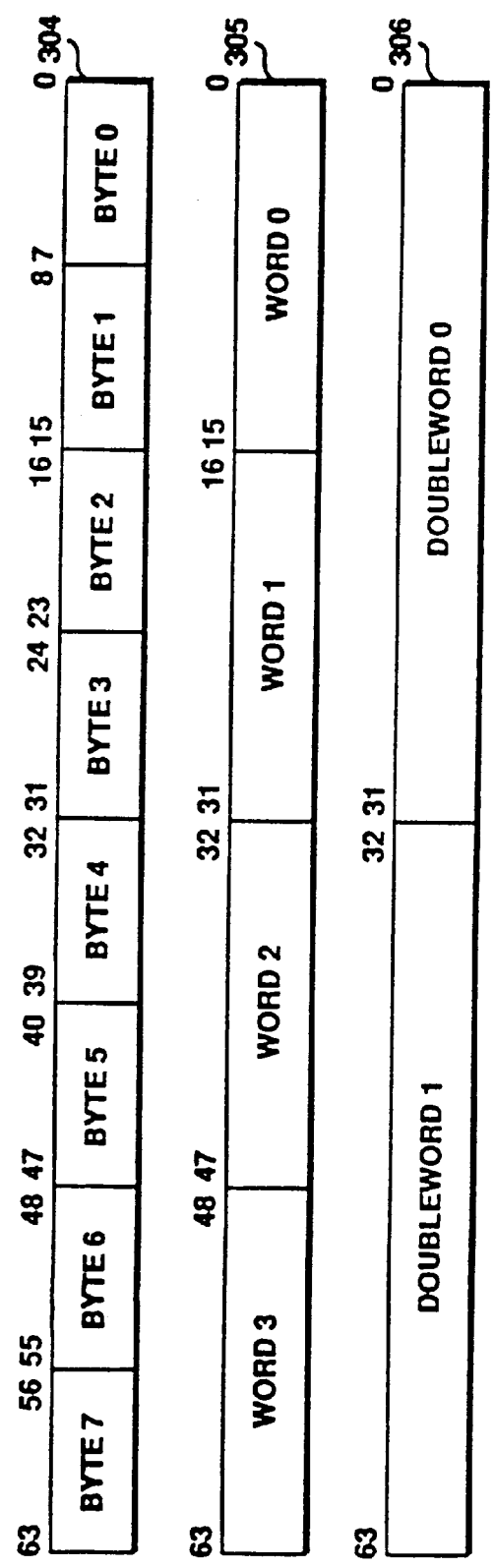

| PREFIX 510 | OPCODE 520 | MOD R/M 530 | SIB 540 | DISPLACEMENT 550 | IMMEDIATE 560 |

Figure 5

COMPUTER IMPLEMENTED METHOD FOR TRANSFERRING PACKED DATA BETWEEN REGISTER FILES AND MEMORY

BACKGROUND OF THE INVENTION

1. Field of the Invention

The present invention relates to computers and, more particularly, to methods for handling novel instructions for the transfer of packed data to and from a multimedia extended register file.

2. Description of Related Art

Today many computers perform multimedia operations which involve processing high volumes of small integer data elements representing audio signals and video images. In order to process the data efficiently, multiple data elements are joined together as packed data sequences. The packed data sequences enable the transfer of up to sixty-four bits of integer data. In addition to the conventional thirty-two bit integer register file, a second extended integer register file is provided to take advantage of the packed data sequences. The second register file typically has extended registers providing storage for sixty-four data bits. Typically, the two register files each include eight registers, providing a total of sixteen registers to store the packed data sequences.

In order to move the packed data sequences to and from the extended register file, a new set of instructions is needed. Typically, to move the packed data sequences between the extended register file and the conventional integer register file, which provide a total of sixteen registers, four bits would be required to address a source operand and four more bits to address a destination operand. However, in the X86 Intel Architecture Series™, the decoder unit is designed to decode an instruction format that only provides three bits to address a source operand and three bits to address a destination operand. Therefore, encoding an instruction to transfer packed data between the 16 registers, using four bits to address each operand would require expensive modifications to the existing decoder unit provided in the Intel Architecture X86 Series™. The modified decoder unit would also be more complex, most likely resulting in additional processing time to decode the instruction.

As such, what is desired is a set of instructions that are able to transfer packed data sequences to and from the extended integer register file, address up to 16 registers using only three bits to address a source operand and up to three bits to address a destination operand, and is encoded in an instruction format that is compatible with available decoder units.

SUMMARY OF THE INVENTION

A method for transferring packed data including the steps of first receiving an instruction from a set of instructions for transferring packed data between an extended register file and either an integer register file or a memory. In one embodiment, the extended register file includes eight registers, with each of the extended register storing up to sixty-four data bits of packed data. The integer register file also includes eight registers. The instructions are encoded in an instruction format having up to three bits addressing a destination operand and up to three bits addressing a source operand. The instruction is then translated to determine a direction of the transfer, a size of said packed data to be transferred, the address of the destination operand, and the address of the source operand. The instructions are decoded by a decoder unit previously designed to decode the instruction format used to encode the set of instructions. In response to receiving the instruction, the packed data is transferred to or from the extended register file in accordance with the specifications of the instruction.

BRIEF DESCRIPTION OF THE DRAWINGS

FIG. 3A illustrates memory data types.

FIG. 3B illustrates packed data-types transferred by the instructions of the present invention.

FIG. 5 is an illustration of the instruction format used to encode the novel instructions of the present invention.

DETAILED DESCRIPTION

FIGS. 1 through 7 of the drawings disclose various embodiments of the present invention for purposes of illustration. One skilled in the art will recognize alternative embodiments that may be employed without departing from the principles of the invention that are illustrated by the structures and methods described herein.

COMPUTER SYSTEM

Figure 1:
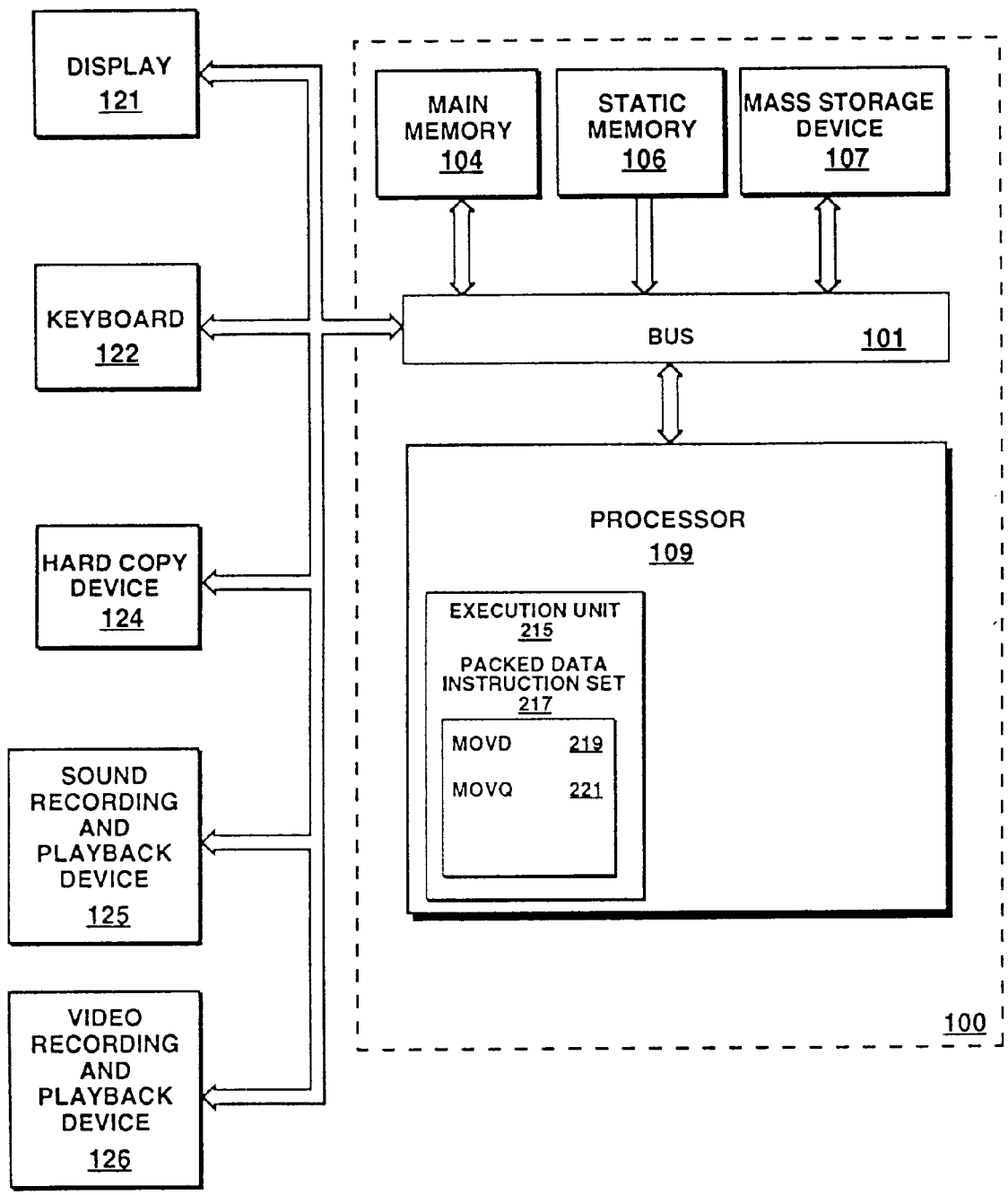
FIG. 1 illustrates an embodiment of the computer system capable of using the method of the present invention.

FIG. 1 illustrates a computer system 100 upon which the present invention can be implemented. Computer system 100 comprises a bus or other communication means 101 for communicating information, and a processor 109 coupled with bus 101 for processing information. System 100 further comprises a random access memory (RAM) or other dynamic storage device 104 (referred to as main memory), coupled to bus 101 for storing information and instructions to be executed by processor 109. Computer system 100 also comprises a read only memory (ROM) and/or static storage device 106 coupled to bus 101 for storing static data and instructions for processor 109.

Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 109.

Another device that may be coupled to bus 101 is hard copy device 124 that may be used for printing instructions, data, or other information on a medium such as paper, film, or similar types of media. Additionally, computer system 100 can be coupled to a device for sound recording and/or playback 125 such as an audio digitizer coupled to a microphone for recording information. Further, the computer system 100 may be coupled to a device for video recording and/or playback 126, such as a video digitizer coupled to a camera for recording information. Further, the device may include a digital to analog (D/A) converter for playing back the recorded images.

PROCESSOR

Figure 2:
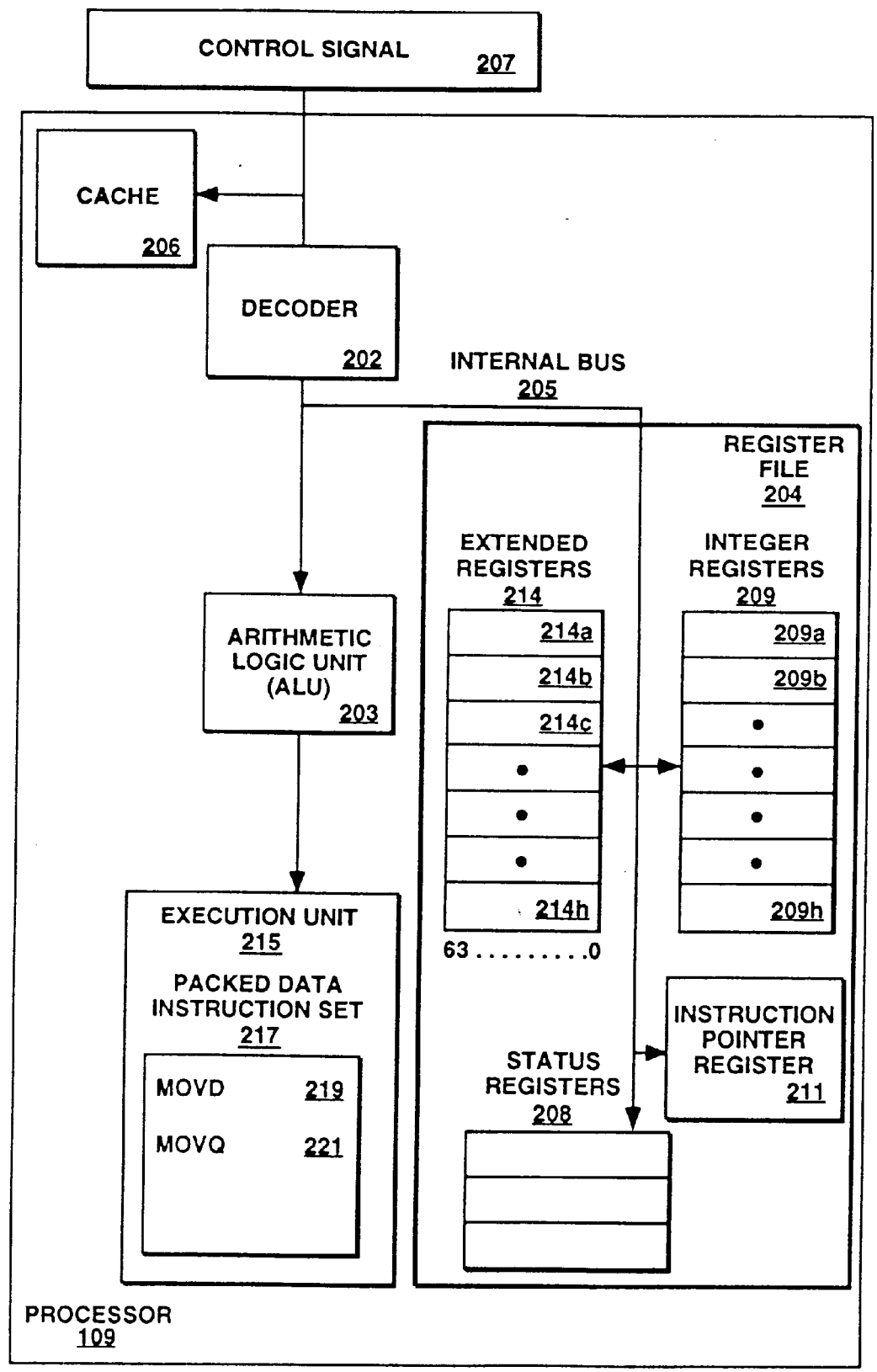
FIG. 2 illustrates an embodiment of the processor capable of using the method of the present invention.

FIG. 2 illustrates a detailed diagram of one embodiment of processor 109. Processor 109 comprises a decoder 202 for decoding controls signals and data used by processor 109. Data can then be stored in register file 204 via internal bus 205.

Depending on the type of data, the data may be stored in integer registers 209, status registers 208, instruction pointer register 211, or extended registers 214. Integer registers 209 contains eight registers, 209a through 209h, each thirty-two bits in length. Extended registers 214 contains eight registers, each sixty-four bits in length. Status registers 208 indicate the status of processor 109. Instruction pointer 211 stores the address of the next instruction to be executed. Integer registers 209, status registers 208, instruction pointer register 211, and extended registers 214 are all connected to internal bus 205.

Arithmetic logic unit 203 (ALU) performs the arithmetic and logic operations carried out by processor 109. Such operations may include addition, subtraction and multiplication, etc. ALU 203 connects to internal bus 205. Cache 206 is an optional element of processor 109 and can be used to cache data, including control signals, from, for example, main memory 104. Cache 206 is connected to decoder 202 and is connected to receive control signal 207.

FIG. 2 additionally illustrates that the processor 109 includes an execution unit 215 for executing instructions. The execution unit 215 is shown including packed data instruction set 217 for performing operations on packed data. In one embodiment, the packed data instruction set 217 includes the packed data instructions MOVD 219 for moving a packed double word to and from the extended registers 214, and MOVQ 221 for moving two packed double words to and from the extended register 214. The packed data format and operation of each of these instructions is further described herein.

DATA AND STORAGE FORMATS

FIG. 3a illustrates some of the data formats as may be used in the computer system of FIG. 1. Processor 109 can manipulate these data formats often used by a multimedia algorithms. A byte 301 contains eight bits of information. A word 302 contains sixteen bits of information, or two bytes. A double word 303 contains thirty-two bits of information, or four bytes.

Storage of smaller data types in a sixty-four bit wide register is an inefficient method of storage. As a result, data used in one embodiment is packed together in one format referred to as packed data. FIG. 3b illustrates three data formats for packed data. Packed data sequence 304 is sixty-four bits long containing eight fields, each field having a packed byte containing eight bits of information. Packed data sequence 305 contains four fields, each field having a packed word containing sixteen bits of information. Packed data sequence 306 contains two fields, each field having a packed double word containing thirty-two bits of information.

INSTRUCTIONS OF THE PRESENT INVENTION

The present invention relates to a method of transferring packed data sequences between the extended register file 214 and either the integer register file 209 or memory 104 by using a set of novel instructions. In alternative embodiments, memory devices 106 and 107 disclosed herein, and other memory devices not disclosed, may be used without departing from the scope of the invention.

Although the extended register file 214 and the integer register file 209 jointly provide up to sixteen registers, the novel instructions are encoded in an instruction format that enables the use of only up to three bits to address one of the sixteen registers as a source operand and up to three bits to address one of the sixteen registers as a destination operand.

In one embodiment, the set of instructions includes a first instruction for storing a packed double word from extended registers 214 to either integer register 209 or memory 104. A second instruction for storing two packed double words from extended register 214 to either a separate register of the extended register file 214 or memory 104. A third instruction for loading a packed double word into extended register 214 from either integer register 209 or memory 104. And, a fourth instruction for loading two packed double words into extended register 214 from either a separate register in the extended register file 214 or memory 104.

Figure 4A:
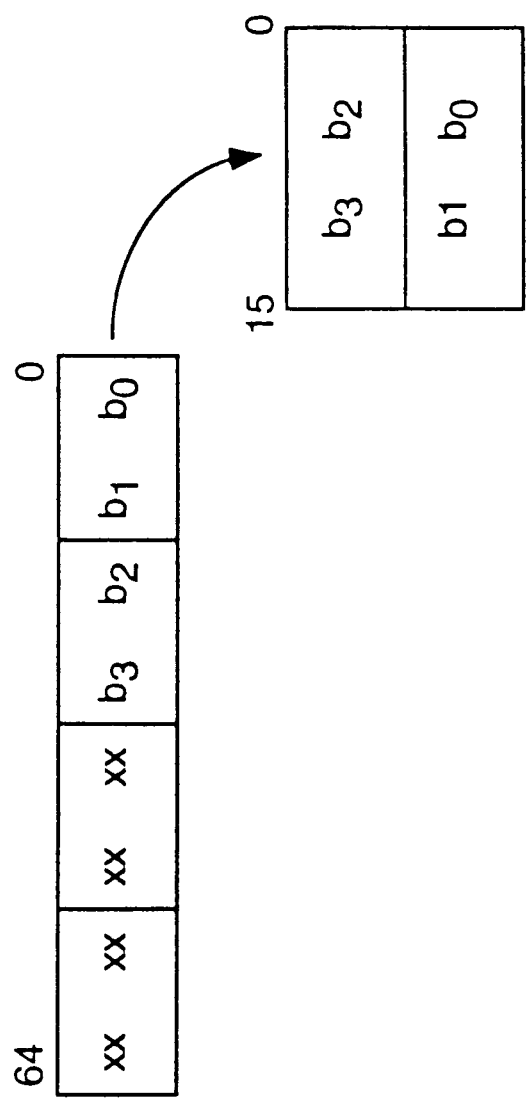
FIG. 4A illustrates an instruction of the invention storing a packed double word from an extended register.
Figure 4B:
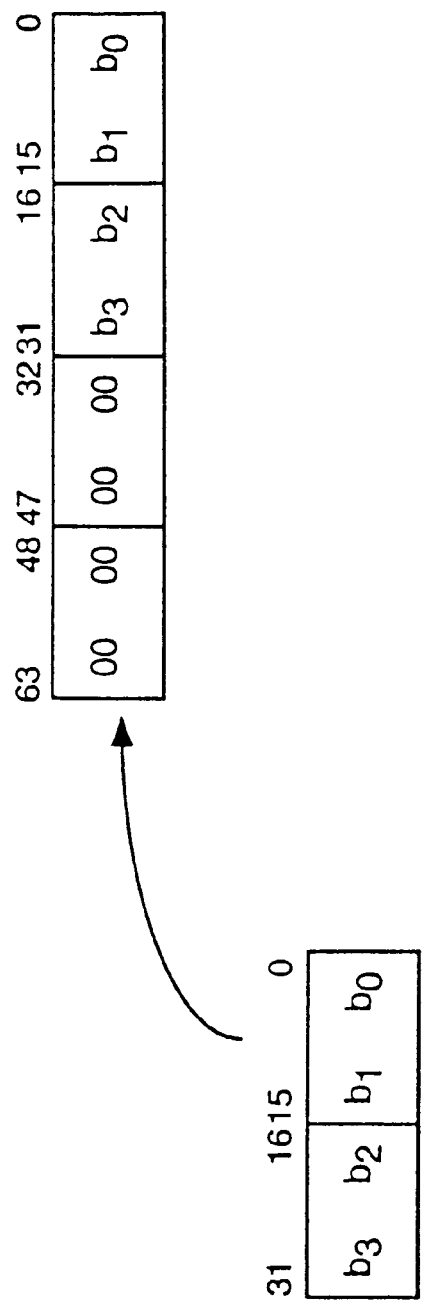
FIG. 4B illustrates an instruction of the invention loading a packed double word into an extended register.

As illustrated in FIG. 4a, when a packed double word is stored from an extended register 214, the low order thirty-two bits of the sixty-four bit extended register 214 are transferred. As illustrated in FIG. 4b, when loading the extended register 214, the low order thirty-two bits of the extended register are initially filled with the packed double word and then the remainder of the extended register 214 is zero extended to sixty-four bits.

The set of instructions achieve the novelty of addressing sixteen registers with only three bits by uniquely encoding the instructions with opcode that specifies the direction of the packed data movement from the perspective of the extended register file 214. Specifically, the opcode is either load or store packed data to or from the extended register file 214, respectively. As a result, the operand addresses do not have to include extra bits to address the specific register files which include the respective operands. For example, when storing packed data, the extended register file 214 includes the source operand, and either the integer register file 209 or memory 104 includes the destination operand. Therefore, only three bits are needed to address the first operand in the eight registers of the extended register file 214, and only three bits to address the second operand in the eight registers of the integer register file 209, or a location in memory 104. Typically, four bits would be necessary to address the location of the operands in the sixteen available registers and memory 104.

In one embodiment, the set of instructions of the present invention are encoded in the Intel Architecture™ MOD R/M instruction format as illustrated in FIG. 5. Using the MOD R/M instruction format provides the advantage of avoiding costly changes to the decoder unit 202, which in an X86 Intel Architecture™ is designed to decode instructions encoded in the MOD R/M instruction format.

More specifically, the instruction format used to encode the novel instructions consist of an optional instruction prefix 510, a primary opcode byte 520, a MOD R/M byte 530 serving as an address specifier, a Scale Index Base (SIB) byte 540, a displacement 550, if required, and an immediate data field 560, if required. The instruction format is described in chapter 25 of the publication entitled *Pentium Processor User's Manual; Volume 3: Architecture and Programming Manual*, Intel Corporation 1994, which is incorporated herein by reference. Smaller encoding fields can be defined within the primary opcode or opcodes 520. These fields define the direction of the operation, the size of the displacements, or the register encoding. Encoding fields vary depending on the class of operation.

Figure 6:
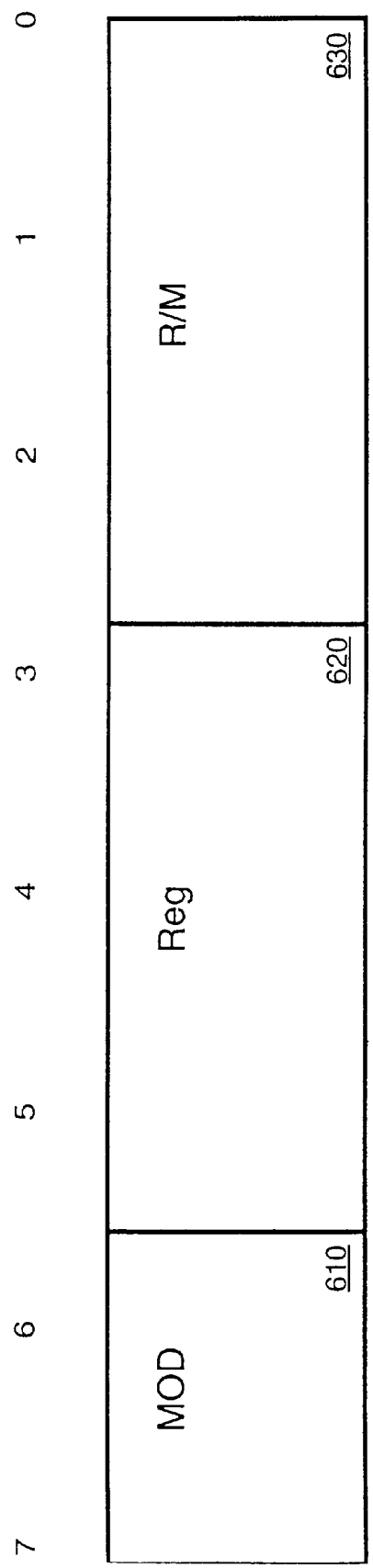
FIG. 6 is an illustration of the MOD R/M byte used in the instruction format used in the present invention to address source and destination operands in the present invention.

In one embodiment, the MOD R/M byte 530 is used to address the operands of the instructions. As illustrated in FIG. 6, the MOD R/M byte 530 contains three fields. The MOD field 610, which occupies the two most significant bits of the byte 530, combines with the R/M 630 field to form thirty-two possible values for addressing eight registers of integer register file 209 or twenty-four address indexing modes of memory 104.

The reg field 620, which occupies the next three bits following the MOD field 610, specifies a register number. The meaning of the reg field 620 is determined by the first opcode byte 520. In the embodiment of FIG. 6, the reg field 620 is used to indicate a register in the extended register file as a first operand of the instructions.

The R/M field 630, which occupies the three least significant bits of the byte 530, can specify a register as the location of an operand, or can address a memory location of memory 104 when used in combination with MOD field 610 as described above. In one embodiment, the R/M field 630 is used to address a second operand of the instructions.

In one embodiment, the instruction prefix 510 of the novel instructions are encoded with the opcode prefix 0F, which is an escape prefix of the opcode. The primary opcode byte 520 of the novel instructions includes the remainder of the operation code further specifying the operation to be performed. Specifically, in the opcode byte 520 the least significant bit, referred to as the word bit, indicates the size of the data movement. The word bit is encoded with a 0 to transfer a packed double word, and a 1 to transfer two packed double words. The fifth bit of the opcode byte 520 is used to indicate the direction of the transfer, that is, whether packed data is stored from or loaded into the extended registers 214. When the fifth bit is 0, packed data is loaded into the extended registers 214, and when it is 1, packed data is stored from the extended registers 214.

As previously described, the MOD R/M byte 530 of the instruction format is used to address the source and destination operands of the instruction. The extended register file 214 is addressed in the reg field 620, and the R/M field 630 is used to address either the integer register file 209 or memory 104. In the first and second instruction, which store packed data from the extended registers 214, the reg field 620 addresses a source operand in the extended register file 214, and the R/M field 630 addresses a destination operand in either a separate register or memory 104. In the third and fourth instructions, which load packed data into the extended register file 214, the reg field 260 addresses a destination operand in the extended register file 214, and the R/M field 630 addresses a source operand in either a separate register or memory 104.

In addition, in one embodiment, the MOD field 610 is used to indicate whether the R/M field 630 is used to address memory 104 or a separate register in register file 209 or 214. Specifically, when packed data is moved between registers, the MOD field 630 is hexadecimally encoded three. For the other encodings, the R/M field 630 addresses memory 104.

Figure 7:
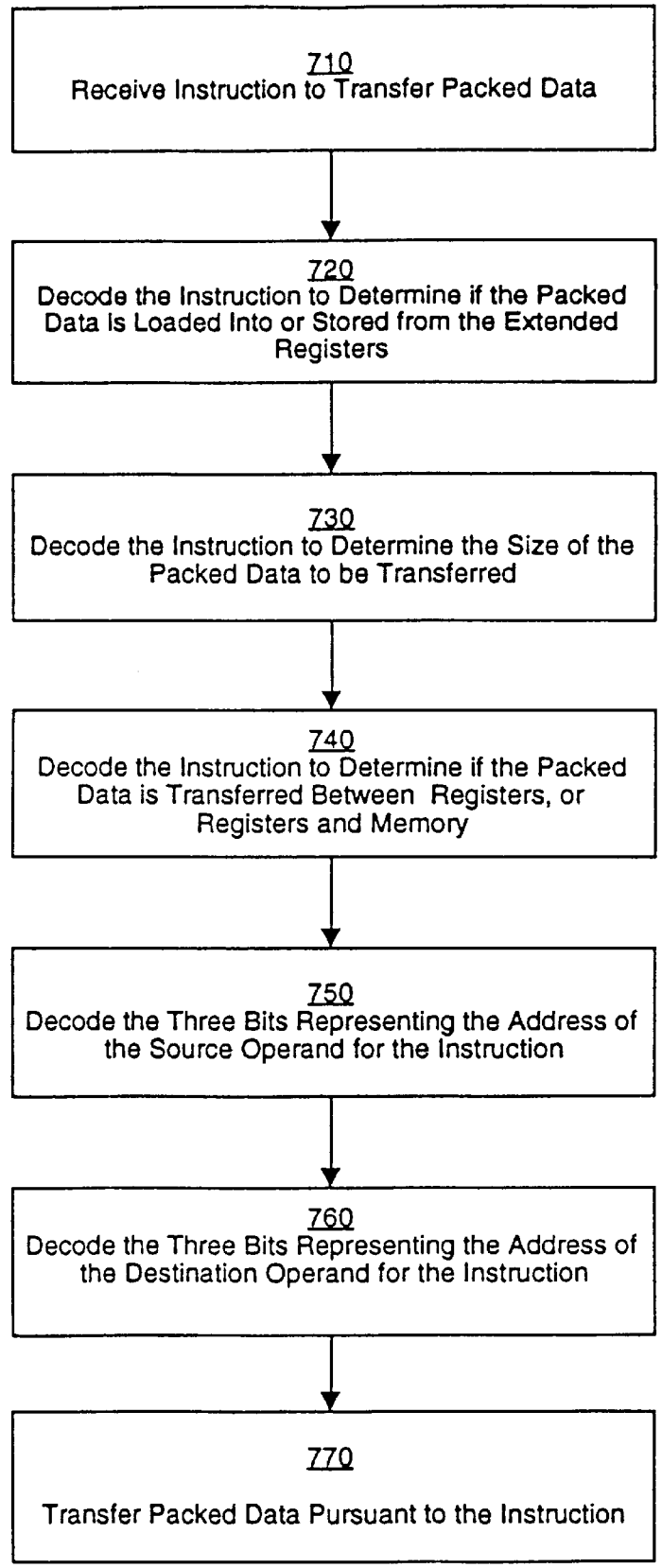
FIG. 7 is a block diagram illustrating the steps followed in transferring the packed data in the present invention.

FIG. 7 is a block diagram further illustrating the steps followed in transfering the packed data in one embodiment of the present invention. In block 710, an instruction is received to transfer packed data. In block 720, the instruction is decoded to determine if the packed data is loaded into the extended registers 214, or stored from the extended registers 214. In block 730, the instruction is further decoded to determine the size of the packed data to be transferred. In block 740, the instruction is decoded to determine if the packed data is transferred between register, or between registers and memory. In blocks 750 and 760, the three bits representing the addresses of the source and destination operands, respectively, are decoded. In conclusion, in block 770, the packed data is transferred pursuant to the decoded instruction.

From the above description, it will be apparent that the invention disclosed herein provides a novel and advantageous method for transferring packed data sequences between an extended register file and either a conventional integer register file or a memory. As will be understood by those familiar with the art, the invention may be embodied in other specific forms without departing from its spirit or essential characteristics, and thus, the described embodiment is not restrictive of the scope of the invention. The following claims are indicative of the scope of the invention, and all variations which come within the meaning and range of equivalency of the claims are to be embraced within their scope.

What is claimed is:

1. In a computer system, a method comprising the steps of:
 a) fetching an instruction from a set of instructions for transferring packed data between a first register file and a second register file, said first register file and said second register file collectively comprising at least $-2^n+1$ registers, said instructions being encoded in an instruction format having a first set of n or fewer bits addressing a destination operand, a second set of n or fewer bits addressing a source operand, and an opcode indicating a direction of said transfer, said instruction format includes a MOD R/M byte having a MOD field, a reg field, and an R/M field;
 b) decoding said instruction to determine a size of said packed data, said direction, an address of said destination operand, and an address of said source operand
 c) executing said instruction to transfer said packed data between said first register file and said second rester file.

2. The method of claim 1, wherein n is an integer equal to 3.

3. The method of claim 1, wherein said set of instructions includes a first instruction for storing a packed double word from said first register file to either said second register file or memory, wherein said reg field addresses a register in said first register file as said source operand, and said R/M field addresses either said second register file or said memory as said destination operand, based on an encoding of said MOD field.

4. The method of claim 3, wherein said set of instructions includes a second instruction for loading a packed double word into said first register file from either said second register file or said memory, wherein said reg field addresses a register in said first register file as said destination operand, and said R/M field addresses either said second register file or said memory as said source operand, based on said encoding of said MOD field.

5. The method of claim 4, wherein the first instruction stores two packed double words from said first register file to either a separate register of said first register file or said memory, based on said encoding of said MOD field.

6. The method of claim 5, wherein the second instruction loads two packed double words into said first register file from either a separate register in said first register file or said memory, based on said encoding of said MOD field.

7. A machine-implemented method for transferring packed data, comprising the steps of:
 a) fetching an instruction from a set of instructions for transferring packed data between a first register file and a second register file, said first register file having eight registers, each said first register storing up to sixty-four data bits, said second register file having eight registers, said instructions are encoded in an instruction format having up to three bits addressing a destination operand, up to three bits addressing a source operand, and an opcode specifying a direction of said transfer, said instruction format includes a MOD R/M byte having a MOD field, a reg field, and an R/M field;

b) decoding said instruction to determine said direction of said transfer, a size of said packed data, an address of said destination operand, and an address of said source operand; and c) in response to receiving said instruction, transferring said packed data in accordance with said translation of said instruction.

8. The method of claim 7, wherein said set of instructions includes a first instruction for storing a packed double word from said first register file to said second register file or memory, wherein said reg field addresses a register in said first register file as said source operand, and said R/M field addresses either said second register file or said memory as said destination operand, based on an encoding of said MOD field.

9. The method of claim 8, wherein the set of instructions includes a second instruction for loading a packed double word into said first register file from either said second register file or said memory, wherein said reg field addresses a register in said first register file as said destination operand, and said R/M field addresses either said second register file or said memory as said source operand, based on said encoding of said MOD field.

10. The method of claim 9, wherein said first instruction stores two packed double words from said first register file to either a separate register in said first register file or said memory, based on an encoding of said MOD field.

11. The method of claim 10, wherein the second instruction loads two packed double words into said first register file from either a separate register in said first register file or said memory, based on an encoding of said MOD field.

12. A method for transferring packed data to and from a multimedia register file, comprising the computer implemented steps of:

a) fetching an instruction for transferring packed data between a multimedia register file and either an integer register file, a separate register of said multimedia register file, or a memory, each said multimedia register storing up to sixty-four data bits, said integer register file and said multimedia register file jointly having registers, said instruction having an opcode that designates a direction of said transfer, said instruction encoded in an instruction format having up to n bits to address a destination operand and having up to n bits to address a source operand, said instruction format includes a MOD R/M byte having a MOD field, a reg field, and an R/M field;

b) decoding said instruction to determine a size of said packed data, said direction of said transfer, an address of said destination operand, and an address of said source operand;

c) in response to receiving said instruction, transferring said packed data.

13. The method of claim 12, wherein n is an integer equal to 3.

14. The method of claim 13, wherein said instruction is one of four instructions each having an address byte having three fields, wherein a first field of said address byte is encoded to indicate said transfer of either said multimedia register to register transfer or multimedia register to memory transfer, a second field of said address byte addresses an operand in said multimedia register file, and a third field in said address byte addresses an operand in either said integer register file, a separate register of said multimedia register file, or said memory.

15. The method of claim 14, wherein a first instruction stores a packed double word from said multimedia register file to either said integer register file or said memory, wherein said second field addresses a register in said multimedia register file as said source operand, and said third field addresses either said integer register file or said memory as said destination operand.

16. The method of claim 15, wherein a second instruction loads a packed double word into said multimedia register file from either said integer register file or said memory, wherein said second field addresses a register in said multimedia register file as said destination operand, and said third field addresses either said integer register file or said memory as said source operand.

17. The method of claim 16, wherein a third instruction stores two packed double words from said multimedia register file to either a separate register of said multimedia register file or said memory, based on said encoding of said first field.

18. The method of claim 16, wherein a fourth instruction loads two packed double words into said multimedia register file from either a separate register in said multimedia register file or said memory, based on said encoding on said first field.

* * * * *

UNITED STATES PATENT AND TRADEMARK OFFICE
CERTIFICATE OF CORRECTION

PATENT NO.    : 5,935,240
DATED         : August 10, 1999
INVENTOR(S)   : Mennemeier et al.

It is certified that error appears in the above-identified patent and that said Letters Patent is hereby corrected as shown below:

<u>Column 6,</u>
Line 25, delete "-$2^n +1$" and insert -- $2^{(n+1)}$ --.
Line 36, delete "rester" and insert -- register --.

<u>Column 8,</u>
Line 50, after "having" insert -- $2^{(n+1)}$ --.

Signed and Sealed this

Sixth Day of May, 2003

JAMES E. ROGAN
*Director of the United States Patent and Trademark Office*